Patented June 18, 1946

2,402,471

UNITED STATES PATENT OFFICE 2,402,471

CALCINING ALUM

Sidney B. Tuwiner, Flushing, and William H. Osborn, New York, N. Y., assignors to Phelps Dodge Corporation, New York, N. Y., a corporation of New York No Drawing. Application February 20, 1943, Serial No. 476,634

5 Claims. (Cl. 23—142)

This invention relates to the treatment of potash alum for the separation and recovery of the aluminum and potassium values therein, and more particularly is concerned with the recovery of relatively pure alumina suitable for reduction to aluminum by the cryolite method.

Many attempts have been made to recover alumina from potash alum which in its normal hydrated form has the chemical formula

$$K_2SO_4 \cdot Al_2(SO_4)_3 \cdot 24H_2O$$

The water of hydration may be driven off at temperatures below 400° C., leaving the anhydrous salt as a combined potassium aluminum sulfate. If this anhydrous salt is heated above 400° C., the aluminum sulfate component decomposes with the evolution of $SO_2$ and $SO_3$ gases, leaving a calcined product consisting of a mixture of potassium sulfate and alumina. This decomposition of the aluminum sulfate component begins to take place at a substantial rate at approximately 700° C. However, as the temperature is raised, the potassium sulfate component may become decomposed. It has been proposed to calcine the anhydrous salt to decompose just the aluminum sulfate component and then leach out with water the potassium sulfate component, leaving alumina in suspension.

This process appears to be a fairly simple one on paper but commercial operations encounter many difficult problems. It is very difficult to obtain a rapid and complete decomposition of the aluminum sulfate component without some decomposition of the potassium sulfate component. After the leaching treatment, the alumina is then contaminated by substantial amounts of $K_2O$ combined chemically as some water-insoluble compound. In the reduction of alumina to aluminum by the standard process of electrolysis in a bath of fused cryolite, the presence of potash is said to have a detrimental effect on the electrolytic pot linings. It is important, therefore, in commercial operations to produce alumina containing no more than 0.2% $K_2O$.

Another difficulty in this process is the slow rate at which the aluminum sulfate component may decompose making it necessary to calcine the material for long periods of time. The physical condition of the mass being calcined is very important in this connection, and normally when the dehydrated alum is heated to around 700 to 750° C. on a large scale, it becomes pasty, which makes the material very difficult to handle and interferes with the liberation of sulfur compounds. Thus, as soon as ½ to ⅔ of the aluminum sulfate is decomposed at these temperatures, the rate at which the sulfur gases are liberated is greatly reduced and the continued decomposition of aluminum sulfate becomes very slow. Also, this pasty material cannot be satisfactorily handled in a continuous calcining furnace such as a rotary kiln.

An object of our invention is to provide a process of calcining potash alum to decompose the aluminum sulfate component without decomposing substantial quantities of the potassium sulfate component, in which fusion or the formation of a pasty mass is avoided and the decomposition of the aluminum sulfate component is accelerated.

Another object of this invention is to control the calcining of potash alum in such a manner as to eliminate $SO_3$ gas as it is formed and thereby accelerate decomposition of the aluminum sulfate component.

Another object of this invention is the recovery of substantially pure alumina from potash alum by calcining the salt in a continuous type furnace to produce a rapid decomposition of the aluminum sulfate component without substantial decomposition of the potassium sulfate component.

A further object of our invention is to calcine potash alum mixed with a carbonaceous or carbonizable material proportioned to react with some or all of the aluminum sulfate or the $SO_3$ gas given off by its decomposition.

Another object of our invention is to calcine potash alum for the production of relatively pure alumina of low potash content by controlling the nature of the gases over the product during its decomposition.

Other objects will be explained and will be apparent from the following description of our invention.

When anhydrous potash alum is heated, it normally begins to give off $SO_2$ and $SO_3$ gases at a substantial rate when a temperature of 700° C. is reached. Under normal commercial conditions, the break down of the aluminum sulfate component continues until the total aluminum sulfate reaches about 12 to 25% of the total mass of material being calcined. At this point, the material begins to become pasty and gradually melts down. When this pasty condition is reached, further decomposition of the aluminum sulfate component is very, very slow and many hours are required to complete this reaction.

This pasty condition has been ascribed by some to the formation of potassium pyrosulfates with relatively low melting points. A more likely theory, however, in the light of our discovery is that a low melting point mixture is formed at some stage during the decomposition of the particular combination of sulfates and other compounds present in the mass being calcined.

In any event, we have found that the formation of this pasty intermediate product can be avoided by calcining the potash alum with a suitable proportion of a carbonaceous or carbonizable material. Any carbonizable material that is converted to a fairly pure carbon and is not distilled off at the temperatures of calcining may be used. For practical purposes, a fairly pure form of carbon such as furnace black or petroleum coke is eminently suited for the reaction.

Apparently the carbon reacts with the $SO_3$ gas liberated from the decomposition, or with the aluminum sulfate component to form $SO_2$ and $CO_2$ according to one of the following equations:

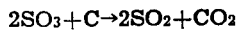

$$2SO_3 + C \rightarrow 2SO_2 + CO_2$$

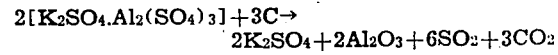

$$2[K_2SO_4 \cdot Al_2(SO_4)_3] + 3C \rightarrow 2K_2SO_4 + 2Al_2O_3 + 6SO_2 + 3CO_2$$

Theoretically, therefore, 3.48% of carbon per unit weight of anhydrous potash alum will be required for this purpose since the carbon is preferably employed to react only with the $SO_3$ liberated, or its equivalent of the decomposed aluminum sulfate. If the bed is well ventilated or other means are provided for carrying off the $SO_3$ gas in a rapid manner, smaller amounts of carbon may be used successfully. On the other hand, if the hot gases in the calcining furnace contain excessive amounts of oxygen or are highly oxidizing they will tend to burn up some of the carbon and larger amounts should be employed. With careful furnace kiln practice, however, 3.5% carbon is about the upper limit permissible. If larger amounts of carbon are used under these conditions, it tends to reduce the potassium sulfate to potassium sulfide and potassium oxide, part of which is present as an insoluble compound with the alumina, thus resulting in a less perfect separation of potash and alumina when the calcined product is leached.

Whatever the explanation for this phenomena may be, we have established that the presence of carbon not only speeds up the thermal decomposition of the aluminum sulfate component at temperatures below the decomposition temperature of potassium sulfate, but actually avoids the formation of a pasty intermediate product otherwise practically unavoidable on a large scale, making it possible to calcine the salt in a continuous type of furnace such as an ordinary direct fired rotary kiln.

The manner in which the carbonaceous material is mixed with the potash alum may, of course, be varied. The carbon or carbonaceous material may be simply intimately mixed with the anhydrous salt before it is charged into the kiln, although we prefer, in order to obtain an intimate mixture, to incorporate the carbonaceous material with the potash alum when it is dehydrated. For example, finely divided carbon may be stirred into a melt of hydrous crystals and this mass may thereupon be dehydrated.

In order to demonstrate the effect of carbon during calcining, the following example is given.

0.5 gram of hydrous alum crystals mixed with 0.009 gram of petroleum coke were heated in a porcelain boat for 1½ hours at 400° C. in a slow stream of air to cause complete dehydration. The dried product was then cooled, ground in a mortar and again heated in the boat for 1½ hours at 650° C. This treatment caused the liberation of 55.4% of the original $SO_3$ content of the mass.

In a similar experiment using the same proportions and procedure, but without any carbon addition, the loss of $SO_3$ after heating for 1½ hours at 700° C. was only 7.08%. It is apparent from these experiments that the presence of carbon accelerates the removal of $SO_3$ at a temperature below the fusion point of partially decomposed alum.

While we do not wish to be limited by any theory, this reaction is apparently explained by the fact that carbon reacts in solid phase with $SO_3$ gas as formed, and thus continually reduces the partial pressure of $SO_3$ in the mass, tending to cause its more rapid elimination.

Reference has been made to the desirability of avoiding decomposition of the potassium sulfate component because of resultant contamination of the alumina after the calcined alum is leached. The ideal control of the calcining process is one which permits stopping the calcining treatment just as soon as decomposition of the aluminum sulfate component is completed, and while there is still sufficient partial pressure of $SO_3$ gas in the mass to retard the decomposition of the potassium sulfate component. Obviously, if too much carbon is employed or too high a calcining temperature is used, or the calcining is continued for too long a time, a partial break down of the potassium sulfate component will result.

We have found that the decomposition of the potassium sulfate component may be retarded by controlling the partial pressure of $SO_3$ gas in and over the mass, or by controlling its equivalent of $SO_2$ and oxygen. This is readily accomplished in a practical manner by recycling exit gas from the calcining kiln into the hot gases entering the discharge end of the kiln. The sulfur gases thus returned and passed through the kiln again are sufficient to maintain a high enough partial pressure of $SO_3$ over the product being calcined, to inhibit the break down of the potassium sulfate component without interfering substantially with the decomposition of the aluminum sulfate component. This makes it possible to control the end point of the calcining operation more closely and avoid the presence of more than 0.2% of $K_2O$ in the final separated alumina.

On a commercial scale operation, we prefer to return a portion of the exit gases from the furnace to the discharge end of the kiln in order to maintain a substantial partial pressure of $SO_3$ over the calcined mass during its passage through the kiln. At the same time we have found this return of exit gases is desirable in order to keep down the flame temperature. The dilution of the flame gases is preferably adjusted so that the hot gases entering the discharge end of the kiln do not exceed about 1200° C.

In other words, the particular proportion of exit gases that is returned may be varied considerably and used not only to maintain the partial pressure of $SO_3$ over the calcined product but also to cool and thereby regulate the temperature of the hot gases entering the discharge end of the kiln. By this procedure it has been found that the calcining process can be readily controlled to a point such that the residual potash in the separated alumina will not exceed 0.2% $K_2O$.

The leaching operation applied to the product may be carried out in any suitable manner, as will be understood by those skilled in the art. For example, the cooled calcined mass is preferably ground and added slowly to sufficient water to form a saturated solution of potassium sulfate. The water is preferably heated to at least 80° C. or higher, and as the charge is added to the water, it is stirred until all lumps are disintegrated. This suspension is then filtered while hot through a filter press and the residue, which is relatively pure alumina, is washed with hot water, keeping the filtrate and wash water separate. The filtrate may then be cooled to crystallize out the potassium sulfate, and the residue, which is substantially pure alumina, may be dried and used for production of aluminum by the cryolite process.

It should be understood that while reference has been made to a calcining temperature of 700° C., the potash alum may be treated in accordance with our invention at somewhat lower temperatures above 400° C. by continuing the heating for longer periods, or somewhat higher temperatures up to about 1100° C. may be used if care is taken to avoid substantial decomposition of the potassium sulfate component. We prefer to conduct the major portion of the calcining treatment by heating the mass to a temperature within the range of 600 to 900° C.

The equipment for calcining the alum may be of any type that is suitable either for batch or continuous operation. A rotary kiln is especially suitable for continuous treatment but the invention is not limited to the use of any particular kind of furnace.

The terms and expressions which we have employed are used as terms of description and not of limitation, and we have no intention, in the use of such terms and expressions, of excluding any equivalents of the features shown and described or portions thereof, but recognize that various modifications are possible within the scope of the invention claimed.

We claim:

1. In a process of calcining potash alum to produce a relatively pure alumina, the steps of heating the potash alum in a furnace to decompose the aluminum sulfate component, and controlling the atmosphere above the charge to inhibit decomposition of the potassium sulfate component by returning to the furnace a portion of the exit gases.

2. In a process of calcining potash alum to produce a relatively pure alumina, the steps of heating the alum with a carbonaceous material in a furnace to decompose the aluminum sulfate component, and returning to the furnace a portion of the exit gases to control the atmosphere above the charge and thereby inhibit decomposition of the potassium sulfate component.

3. In a process of treating potash alum to recover alumina therefrom, the steps of mixing finely divided carbon with molten potash alum, dehydrating the mixture, and calcining the dehydrated mixture to decompose the aluminum sulfate component therein.

4. In a process of treating potash alum to recover alumina therefrom, the steps of mixing finely divided carbon with molten potash alum, dehydrating the mixture, and calcining the dehydrated mixture to decompose the aluminum sulfate component therein, the amount of said carbon being sufficient to hasten decomposition of the aluminum sulfate component but insufficient to decompose substantial amounts of the potassium sulfate component.

5. In a process of treating potash alum to recover alumina therefrom, the steps of mixing finely divided carbon with the molten alum, dehydrating the mixture, calcining the dehydrated mixture in a furnace at a temperature above 400° C. but below 1100° C. and returning exit gases to the furnace to increase the partial pressure of sulfur gases over the mass being calcined.

SIDNEY B. TUWINER.
WILLIAM H. OSBORN.